(12) United States Patent
Evans et al.

(10) Patent No.: US 8,149,272 B2
(45) Date of Patent: Apr. 3, 2012

(54) MULTIPLE VIEW DISPLAY

(75) Inventors: Allan Evans, Oxford (GB); Jonathan Mather, Oxford (GB); Graham Jones, Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 1251 days.

(21) Appl. No.: 11/575,599

(22) PCT Filed: Sep. 20, 2005

(86) PCT No.: PCT/JP2005/017670
§ 371 (c)(1),
(2), (4) Date: Aug. 8, 2007

(87) PCT Pub. No.: WO2006/033447
PCT Pub. Date: Mar. 30, 2006

(65) Prior Publication Data
US 2008/0043092 A1 Feb. 21, 2008

(30) Foreign Application Priority Data
Sep. 21, 2004 (GB) .................................. 0420945.8

(51) Int. Cl.
*H04N 13/04* (2006.01)
(52) U.S. Cl. .................. 348/51; 348/54; 348/58; 348/59
(58) Field of Classification Search .................. 348/44, 348/51, 58, 59, 276
See application file for complete search history.

(56) References Cited

U.S. PATENT DOCUMENTS

| | | | | |
|---|---|---|---|---|
| 5,991,073 A * | 11/1999 | Woodgate et al. | ........... | 359/462 |
| 6,055,013 A * | 4/2000 | Woodgate et al. | ........... | 348/59 |
| 6,611,243 B1 * | 8/2003 | Moseley et al. | ........... | 348/51 |
| 6,703,989 B1 * | 3/2004 | Harrold et al. | ........... | 348/58 |
| 6,929,369 B2 * | 8/2005 | Jones | ........... | 348/44 |
| 7,782,409 B2 * | 8/2010 | Kean et al. | ........... | 349/15 |
| 2004/0057016 A1 * | 3/2004 | Jones | ........... | 353/7 |
| 2004/0119896 A1 * | 6/2004 | Kean et al. | ........... | 349/25 |
| 2006/0152812 A1 * | 7/2006 | Woodgate et al. | ........... | 359/619 |
| 2006/0164528 A1 * | 7/2006 | Harrold et al. | ........... | 348/276 |

(Continued)

FOREIGN PATENT DOCUMENTS

EP 1 067 805 1/2001

(Continued)

OTHER PUBLICATIONS

International Search Report for corresponding Application No. PCT/JP2005/017670 mailed May 18, 2006.

(Continued)

*Primary Examiner* — Quang N. Nguyen
(74) *Attorney, Agent, or Firm* — Renner, Otto, Boisselle & Sklar, LLP

(57) ABSTRACT

A multiple view display comprises a parallax optic such as a parallax barrier (25) and a spatial light modulator (20) having a plurality of pixels arranged as rows and columns. The parallax optic (25) cooperates with the pixel structure to create a plurality of primary viewpoint-corrected viewing windows. The rows are arranged as groups and the parallax elements are arranged as rows. Each parallax element is aligned with a respective group of rows of the pixels. The pixels comprise sets of pixels of different colors arranged so that the sequence of visible colors viewable in each viewing window through each parallax element of each row of parallax elements is different from the sequence of pixel colors visible through the or each nearest parallax element in the or each adjacent row of parallax elements.

45 Claims, 17 Drawing Sheets

U.S. PATENT DOCUMENTS

2006/0170616 A1    8/2006    Hirayama et al.
2007/0109400 A1*   5/2007    Woodgate et al. ............. 348/47

FOREIGN PATENT DOCUMENTS

| EP | 1 427 223    | 6/2004 |
|----|--------------|--------|
| GB | 2 399 653    | 9/2004 |
| JP | 2001-075049  | 3/2001 |
| JP | 2004-206089  | 7/2004 |

OTHER PUBLICATIONS

Japanese Office Action for corresponding Japanese Application No. 2007-506394 dated Jan. 12, 2011.

Korean Office Action for corresponding application No. 10-2007-7008956 dated Nov. 27, 2008.

* cited by examiner

MULTIPLE VIEW DISPLAY

TECHNICAL FIELD

The present invention relates to a multiple view display.

Such displays may be used, for example, when two or more different people need to see two or more different images on the same display screen. The viewing angle difference is preferably quite large (around 60 degrees) between viewers.

Such displays may also be used as three-dimensional (3D) displays, especially autostereoscopic displays. Such displays may be used in 3D mobile handsets, 3D games, 3D computer monitors, 3D laptop displays, 3D workstations and 3D professional imaging (e.g. for medical, design or architectural usage). In some 3D displays, it is necessary to increase the eye separation distance for a particular viewing distance or decrease the viewing distance for a particular eye separation. Both of these cases require a wider separation angle.

BACKGROUND ART

In normal vision, the two human eyes perceive views of the world from different perspectives due to their separate location within the head. These two perspectives are then used by the brain to assess the distance to various objects in a scene. In order to build a display which will effectively display a three dimensional image, it is necessary to re-create this situation and supply a so-called "stereoscopic pair" of images, one to each eye of the observer.

Three-dimensional displays are classified into two types depending on the method used to supply the different views to the eyes. Stereoscopic displays typically display both of the images over a wide viewing area. However, each of the views is encoded, for instance by colour, polarisation state or time of display, so that a filter system of glasses worn by the observer can separate the views and will only let each eye see the view that is intended for it.

Autostereoscopic displays require no viewing aids to be worn by the observer but the two views are only visible from defined regions of space. The region of space in which an image is visible across the whole of the display active area is termed a "viewing region". If the observer is situated such that one of their eyes is in one viewing region and the other eye is in the viewing region for the other image of the pair, then a correct set of views will be seen and a three-dimensional image will be perceived.

For flat panel autostereoscopic displays, the formation of the viewing regions is typically due to a combination of the pixel structure of the display unit and an optical element, generically termed a parallax optic. An example of such an optic is a parallax barrier. This element is a screen with vertical transmissive slits separated by opaque regions. This screen can be set in front of a spatial light modulator (SLM) with a two-dimensional array of pixel apertures as shown in FIG. 1.

The display comprises a transmissive spatial light modulator in the form of a liquid crystal device (LCD) comprising an active matrix thin film transistor (TFT) substrate 1, a counter substrate 2, a pixel (picture element) plane 3 formed by a liquid crystal layer, polarisers 4 and viewing angle enhancement films 5. The SLM is illuminated by a backlight (not shown) with illumination in the direction indicated by an arrow 6. The display is of the front parallax barrier type and comprises a parallax barrier having a substrate 7, an aperture array 8 and an anti-reflection (AR) coating 9.

The SLM is arranged such that columns of pixels are provided extending vertically for normal viewing with the columns having a horizontal pitch p. The parallax barrier provides an array 8 of apertures or slits with the slits being parallel to each other and extending parallel to the pixel columns. The slits have a width $2w$ and a horizontal pitch b and are spaced from the pixel plane 3 by a separation s.

The display has an intended viewing distance $r_o$ with left and right viewing windows 10 and 11 at the widest parts of the viewing regions defining a window plane 12. The viewing windows 10 and 11 have a pitch e which is generally made substantially equal to the typical or average human eye separation. The centre of each primary viewing window 10, 11 subtends a half angle a to the display normal.

The pitch b of the slits in the parallax barrier is chosen to be close to an integer multiple of the pixel pitch p of the SLM so that groups of columns of pixels are associated with a specific slit of the parallax barrier. FIG. 1 shows an SLM in which two pixel columns are associated with each slit of the parallax barrier.

The windows 10 and 11 are formed by the cooperation of each slit of the parallax barrier 7-9 with the pixels associated with it. However, adjacent pixels may cooperate with each slit to form additional viewing windows (not shown) which are located on either side of the windows 10 and 11 in the windows plane 12. The windows 10 and 11 are referred to as primary viewing windows whereas any additional windows are referred to as secondary viewing windows.

FIG. 2 of the accompanying drawings shows the angular zones of light created from an SLM and parallax barrier where the parallax barrier has a pitch b of an exact integer multiple of the pixel column pitch p. In this case, the angular zones coming from different locations across the display panel surface intermix and a pure zone of view for image 1 or image 2 does not exist. In order to address this, the pitch b of the parallax optic is reduced slightly so that the angular zones converge at the window plane 12 in front of the display. This change in the parallax optic pitch is termed "viewpoint correction" and is shown in FIG. 3 of the accompanying drawings. The viewing regions created in this way are roughly kite shaped.

For a colour display, each pixel is generally provided with a filter associated with one of the three primary colours. By controlling groups of three pixels each with a different colour filter, substantially all visible colours may be produced. In an autostereoscopic display, each of the stereoscopic image "channels" must contain sufficient of the colour filters for a balanced colour output.

Another known type of directional display is the rear parallax barrier display as shown in FIG. 4 of the accompanying drawings. In this case, the parallax barrier 7, 8 is placed behind the SLM 1 to 5 i.e. between the SLM and the backlight. This arrangement has the advantage that the barrier is kept behind the SLM away from possible damage.

Lenticular screens are used to direct interlaced images to multiple directions, which can be designed to give a 3D image or give multiple images in multiple directions. Practical lenses tend to suffer from scatter and poor anti-reflection performance so that the surface is very visible in both ambient and backlit environments. Therefore, the image quality of lenticular screens can be poor and the system suffers from similar problems as parallax barriers such as the need for close proximity to the image pixels. An array of prism structures may be used in a similar way.

Holographic methods of image splitting also exist but they suffer from viewing angle problems, pseudoscopic zones and a lack of easy control of the images.

Micropolariser displays use a polarised directional light source and patterned high precision micropolariser elements aligned with the LCD pixels. Such a display offers the potential for high window image quality as well as 2D/3D function in a compact package. The dominant requirement is the incorporation into the LCD of micropolariser elements to avoid parallax issues.

FIG. 5 illustrates three known types of dual view displays referred to as P1, P2 and P3. Each of these displays is of the front parallax barrier type but could equally well be of the rear parallax barrier type or could be embodied using different types of parallax optics. The P1 display comprises an LCD 20a comprising columns of pixels displaying the two views as interlaced vertical strips with left and right strips being displayed by interlaced single columns of pixels. FIG. 5 illustrates the displays as being autostereoscopic 3D displays with a viewer being illustrated at 30. A column 21a of pixels displays a strip of the right eye image whereas a column 22a displays a strip of the left eye image. The adjacent columns 23a and 24a display left eye and right image strips, and so on across the LCD 20a. A parallax barrier 25a is disposed in front of the LCD 20a and controls which pixel columns are visible to which eye of the viewer 30 in the usual way.

The P2 display differs from the P1 display in that pairs of adjacent pixel columns display a strip of one of the views. For example, the pair of adjacent pixel columns 21b and 23b and the pair of adjacent pixel columns 26b and 27b display respective strips of the right eye view whereas the pair of pixel columns 22b and 24b and the pair of pixel columns 28b and 29b display respective strips of the left eye view. The barrier 25b provides wider slits of larger pitch spaced further from the LCD 20b than the barrier 25a for the P1 display. Thus, each eye of the observer 30 can see two columns of pixels through each slit of the barrier 25b.

The P3 display differs from the P1 and P2 displays in that each eye of the viewer 30 sees three columns of pixels through each slit of the parallax barrier 25c and each strip of each of the two views displayed by the LCD 20c is displayed by three adjacent columns of pixels. Thus, the pixel columns 21c, 23c, 28c and the pixel columns 27c, 31c, 32c display two strips of the left eye view whereas the pixel columns 22c, 24c, 26c and the pixel columns 29c, 33c, 34c display two strips of the right eye view.

In general, displays can be classified as being of Pn type where, in each primary viewing window, n columns of pixels are viewable and each strip of each view is displayed by n adjacent columns of pixels. Pn displays where n is greater than one have advantages over P1 displays in that higher resolution LCD panels or larger separation between the barrier slit plane and the pixel plane can be used without changing the viewing distance of display at which viewpoint correction is provided, i.e. the window plane. However, such displays have disadvantages in that the barrier structure may be more visible to the viewer and colour defects as described hereinafter may be produced.

FIG. 6 illustrates a P2 type of display in which a conventional vertically striped colour filter (or vertical strips of colour pixels) is used. Thus, the colour filter comprises a repeating pattern of vertical red (R), green (G), and blue (B) strips (or intrinsically coloured pixels are arranged in this way). The effect of this for one view is illustrated at 35. In particular, the order of colours seen in that view is not the RGBRGB . . . pattern of the underlying colour pixels but, instead, is RGGBBRRG . . . .

Thus, the viewer may perceive red, green and blue strips on a scale which is four times larger than the pitch of the pixel columns.

FIG. 7 illustrates a P3 type of display, again having pixel colours arranged as repeating RGB columns. When viewed from the middle of a viewing window, there are no undesirable colour artifacts and the red, green and blue pixel colours are visible in the correct ratios through each slit of the barrier 25.

FIG. 8 illustrates what happens when adjacent groups of pixels for left and right images display different image data. In particular, by way of example, each set of three pixel columns such as 36 for the left eye image is shown displaying white whereas the pixel columns such as 37 displaying the right eye image are shown as being black. When the display is viewed from the centre of each viewing window as illustrated at 38, there are no undesirable visual artifacts.

FIG. 8 illustrates at 39 the effect of a viewer moving to the left as compared with the situation illustrated at 38. This is equivalent to a relative movement to the right of the barrier 25. The effect of this is that each red column of pixels of the left eye view becomes increasingly obscured. Although the red pixels of the right eye view become visible, because they are black, the effect is that there is a colour shift towards cyan in the left eye view as perceived by the viewer. Thus, colour artifacts which are dependent on the image being displayed are perceived by the viewer when viewing the display from other than the optimal position.

GB2399653 discloses a non-periodic parallax barrier structure in which groups of evenly spaced slits are themselves evenly spaced apart with a different horizontal pitch. Vertically striped colour filtering is also disclosed.

WO02091348 discloses a single view or two-dimensional (2D) display having a non-standard pattern of pixel colouring.

DE19822342 discloses a multiple view display of the P3 type. In order to allow for lateral movement of an observer without shifting a parallax barrier structure relative to a pixel structure, columns of pixels additional to those viewable through each slit when the display is viewed correctly are switched.

Schmidt et at, "Multi-Viewpoint Autostereoscopic Displays from 4D-Vision", Proc. SPIE, vol. 4660, pp 212-221 (2002) and Son et at, "Moiré Pattern Reduction in Full-Parallax Autostereoscopic Imaging Systems Using Two Crossed Lenticular Plates as a Viewing Zone Forming Optics", Proceedings of the tenth International Display Work-shop-Fukuoka 2003, paper 3D2-2 disclose so-called staggered parallax barriers in which the slits are arranged at an acute angle to the column direction of the display structure. Such arrangements are disclosed for reducing Moiré patterning in displays of the P1 type.

EP 1 427 223 and EP 0 829 743 discloses P1 displays with repeating groups of RGB columns.

EP 1 401 216, EPO 0 860 728, US 2002/0001128 and EP 0 847 208 discloses viewer position indications in P1 displays.

DISCLOSURE OF THE INVENTION

According to a first aspect of the invention, there is provided a multiple view display comprising: a parallax optic comprising a plurality of parallax elements spaced apart at a single first pitch; and a spatial light modulator comprising a plurality of columns of pixels arranged with a second pitch providing viewpoint correction for creating n primary viewing windows for viewing n views, where n is an integer greater than one, with w columns of pixels being viewable through each parallax element in each viewing window, where w is an integer greater than one, the pixels of each column being of a same colour, the columns being of x different colours, where x is an integer greater than two, and being arranged as a sequence of colours comprising repeating groups of a same sub-sequence, characterised in that each group comprises y subgroups of z columns, where y is an integer greater than one and z is an integer greater than or equal to x, each subgroup containing columns of all x colours, the smallest repetition pitch of the sequence being equal to y.z columns.

The modulator may include a striped colour filter arrangement whose stripes are aligned with the columns.

The number x of colours may be equal to three. The three colours may be primary colours. The primary colours may be red, green and blue.

The number z of columns of each subgroup may be equal to x.

The number w of columns viewable in each window may be equal to two. The number y of subgroups in each group may be equal to three. Each sub-sequence may be red, green, blue, green, blue, red, blue, red, green.

The number w of columns viewable in each window may be equal to three. The number y of subgroups in each group may be equal to six. Each sub-sequence may be red, green, blue, red, green, blue, green, blue, red, green, blue, red, blue, red, green, blue, red, green.

According to a second aspect of the invention, there is provided a multiple view display comprising: a parallax optic comprising a plurality of parallax elements; and a spatial light modulator comprising a plurality of pixels arranged as rows and columns cooperating with the parallax optic to create n primary viewpoint-corrected viewing windows for viewing n views, where n is an integer greater than one, with a respective single column of pixels being viewable through each parallax element in each viewing window, the pixels being arranged as composite colour groups for displaying respective colour image elements, each group comprising z pixels of x different colours disposed adjacent each other in the same column, where x is an integer greater than two and z is an integer greater than or equal to x, the pixels of each colour for each view being disposed so as to be substantially evenly spaced horizontally and substantially evenly spaced vertically, characterised in that the order in the column direction of the colours of the pixels of each group is different from the order in the column direction of the colours of the pixels of each adjacent group in the same rows.

The pixels of each colour may be disposed so as to be substantially evenly spaced horizontally and substantially evenly spaced vertically on the modulator.

The pixels may be arranged in the row direction as repeating sets of z pixels of the x different colours with each row being offset in the row direction relative to each adjacent row by a number of pixels greater than zero and less than z. The offsets between adjacent rows may have the same magnitudes. The offsets between adjacent rows may have the same directions.

The number x of different colours may be three. The three colours may be primary colours. The primary colours may be red, green and blue.

The number z of pixels in each group may be equal to x.

According to a third aspect of the invention, there is provided a multiple view display comprising: a parallax optic comprising a plurality of parallax elements; and a spatial light modulator comprising a plurality of pixels arranged as rows and columns cooperating with the parallax optic to create n primary viewpoint-corrected viewing windows for viewing n views, where n is an integer greater than one, with w pixels in each row being viewable through each parallax element in each viewing window, where w is an integer greater than one, characterised in that the rows are arranged as groups and the parallax elements are arranged as rows, each of which is aligned with a respective group of rows of pixels, the pixels comprising sets of pixels of different colours arranged such that the sequence of pixel colours viewable in each viewing window through each parallax element of each row of parallax elements is different from the sequence of pixel colours viewable through the or each nearest parallax element in the or each adjacent row of parallax elements.

The parallax elements may be aligned in the row direction. The parallax elements may be continuous in the column direction. The pixels may be arranged as repeating colour sequences in the row direction and the rows of pixels of each adjacent pair of groups may be offset with respect to each other in the row direction by at least one pixel pitch and by less than the smallest repetition pitch of the repeating colour sequence.

The pixels of each colour may be arranged as columns. The parallax elements of each adjacent pair of rows may be offset with respect to each other in the row direction.

The offsets may be of the same magnitude.

The offsets may be in the same direction.

The groups of rows of pixels or the rows of parallax elements may be arranged as sets with offsets of the sets being in the same direction and with the offsets of adjacent pairs of sets being in opposite directions.

Each group of rows may comprise a single row.

Each group of rows may comprise a plurality of rows. Each group of rows may comprise n rows, the display may be rotatable between a portrait orientation and a landscape orientation, and the parallax elements may be arranged to provide two dimensional parallax. The offset may differ from twice the pitch of the columns to provide viewpoint correction. The pixels of each row may be arranged as groups of n.w pixels separated from each other by the pitch of the columns.

The number w may be equal to two and the different sequences of pixel colours may comprise different combinations.

The number w may be equal to three and the different sequences of pixel colours may comprise different per-mutations.

The parallax optic may be a parallax barrier.

The spatial light modulator may be a light-attenuating modulator. The modulator may be transmissive. The modulator may be a liquid crystal device.

The number n of windows may be equal to two.

The sets of pixels may be of three colours. The three colours may be primary colours. The primary colours may be red, green and blue.

It is thus possible to provide an improved multiple view display. Embodiments and examples of such a display may achieve combinations of one or more of the following advantages:

Improved image quality;

Reduced colour artifacts in multiple view mode;

Reduced colour artifacts when used in single view mode;

Reduction in colour artifacts dependent on viewer position.

Pn displays where n is greater than one provide an advantage in that the space in between a pixel plane of the spatial light modulator and a plane containing the parallax elements may be made greater than for P1 displays. Thus, any substrate between the planes can be of larger thickness and this reduces manufacturing problems, for example in handling relatively thin glass. In addition, it makes it possible or easier for the parallax optic, such as a parallax barrier, to be of an active type without requiring the use of thin substrates such as thin glass. It is therefore easier to provide a display which is switchable between multiple view and single view modes. For example, a parallax barrier can be embodied by a liquid crystal device which can be switched to a substantially uniform transmissive mode so as effectively to disable the parallax barrier and permit normal viewing of a single image or view throughout a wide viewing region.

BRIEF DESCRIPTION OF THE DRAWINGS

The invention will be further described, by way of example, with reference to the accompanying drawings, in which:

FIG. 12 illustrates another pixel arrangement for use in an embodiment of the invention;

FIGS. 14 to 16 illustrate further pixel arrangements for displays constituting embodiments of the invention;

FIG. 20 illustrates a display of the type shown in FIG. 19 with a zig-zag barrier slit arrangement;

FIG. 21 illustrates a display of the type shown in FIG. 17 with a zig-zag barrier slit arrangement;

BEST MODE FOR CARRYING OUT THE INVENTION

Figure 1:
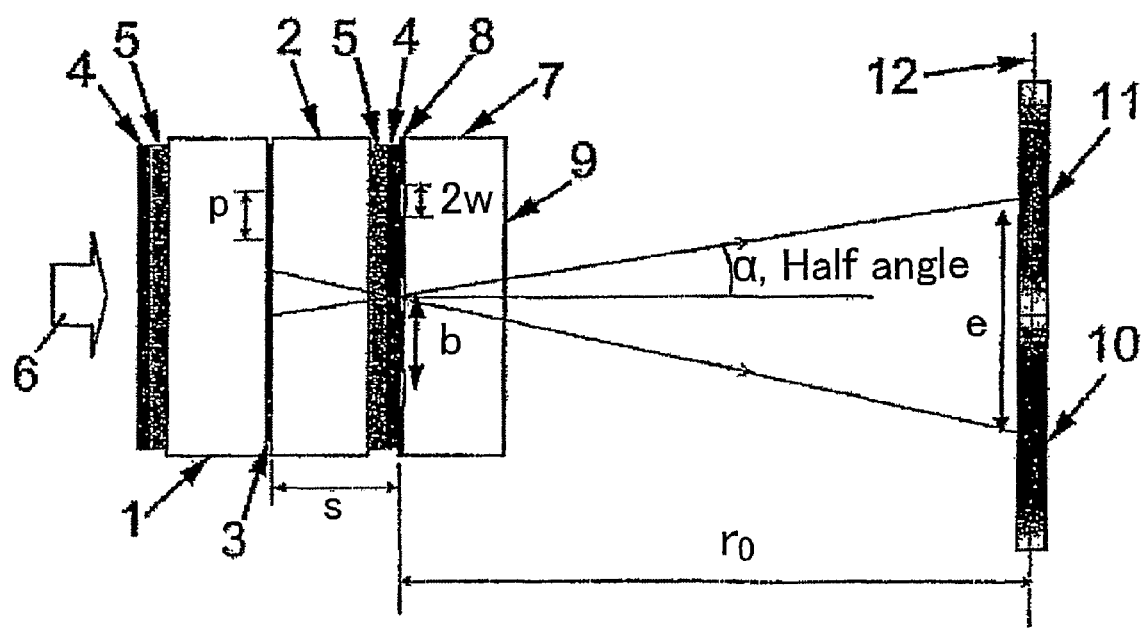
FIG. 1 is a diagrammatic horizontal cross-sectional view of a known multiple view display.
Figure 2:
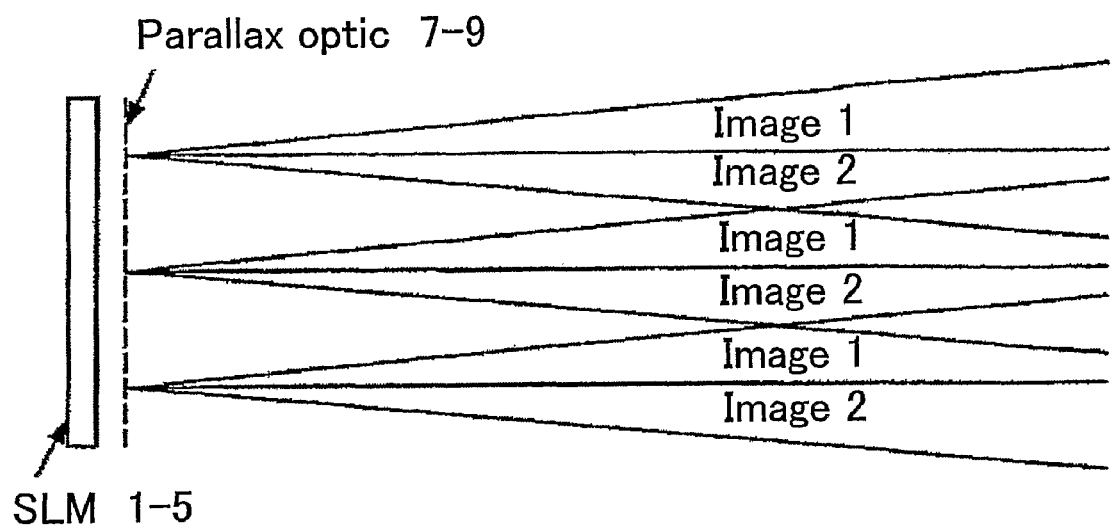
FIGS. 2 and 3 are diagrammatic plan views illustrating the generation of viewing regions and the effect of viewpoint correction.
Figure 3:
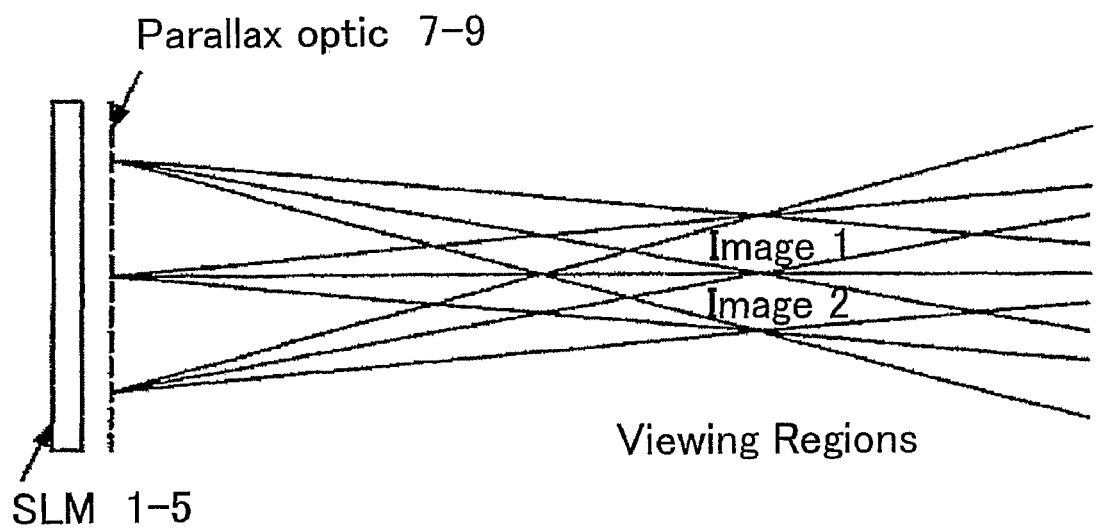
Figure 4:
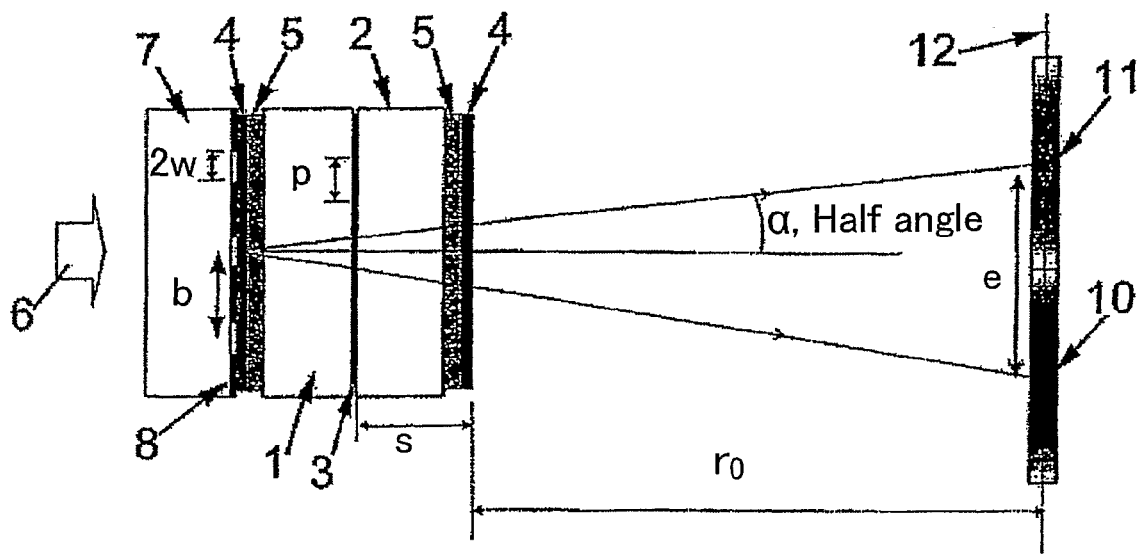
FIG. 4 is a diagrammatic horizontal cross-sectional view of another known multiple view display.
Figure 5:
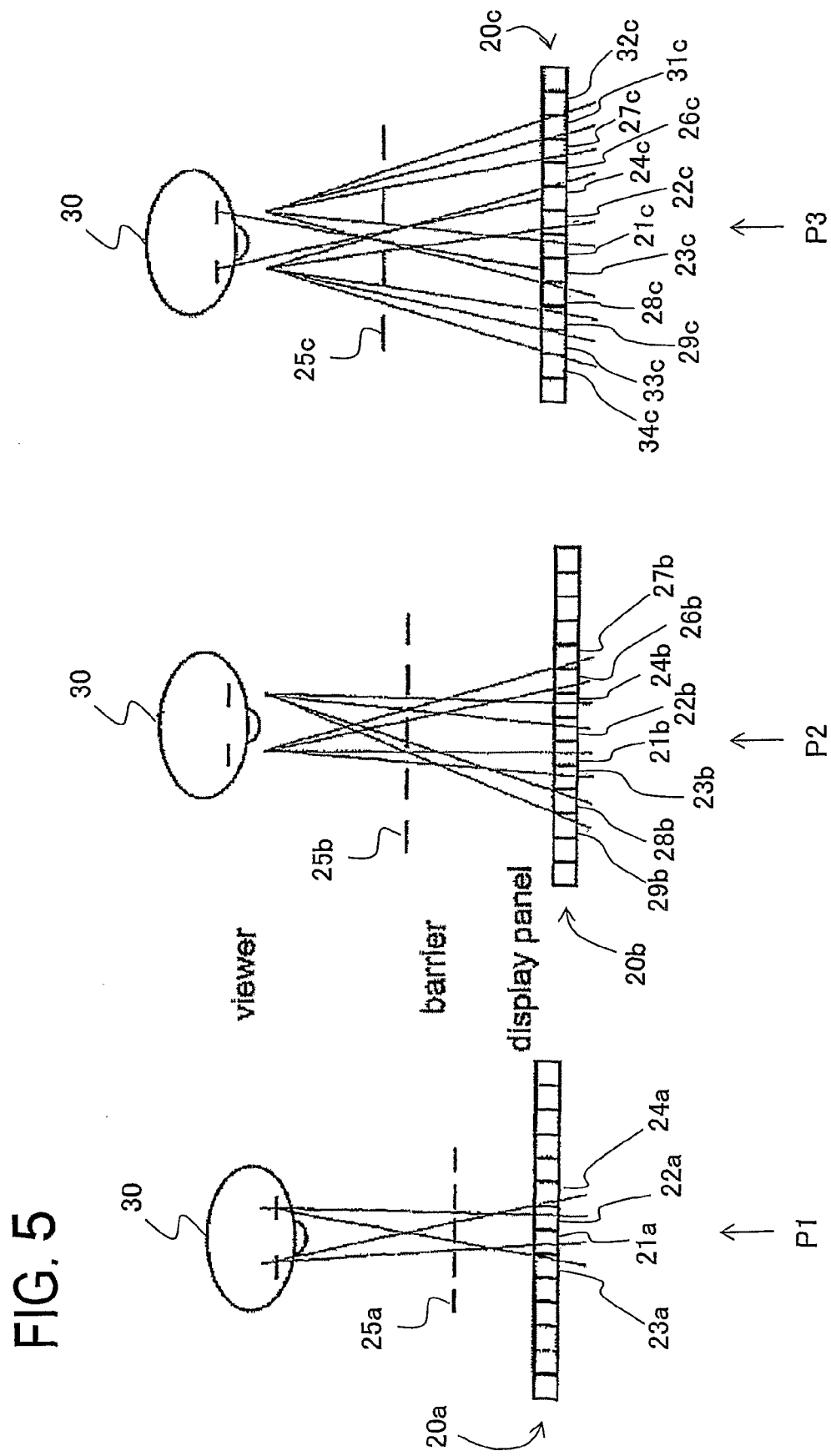
FIG. 5 is a diagrammatic plan view illustrating different types of known multiple view displays.
Figure 6:
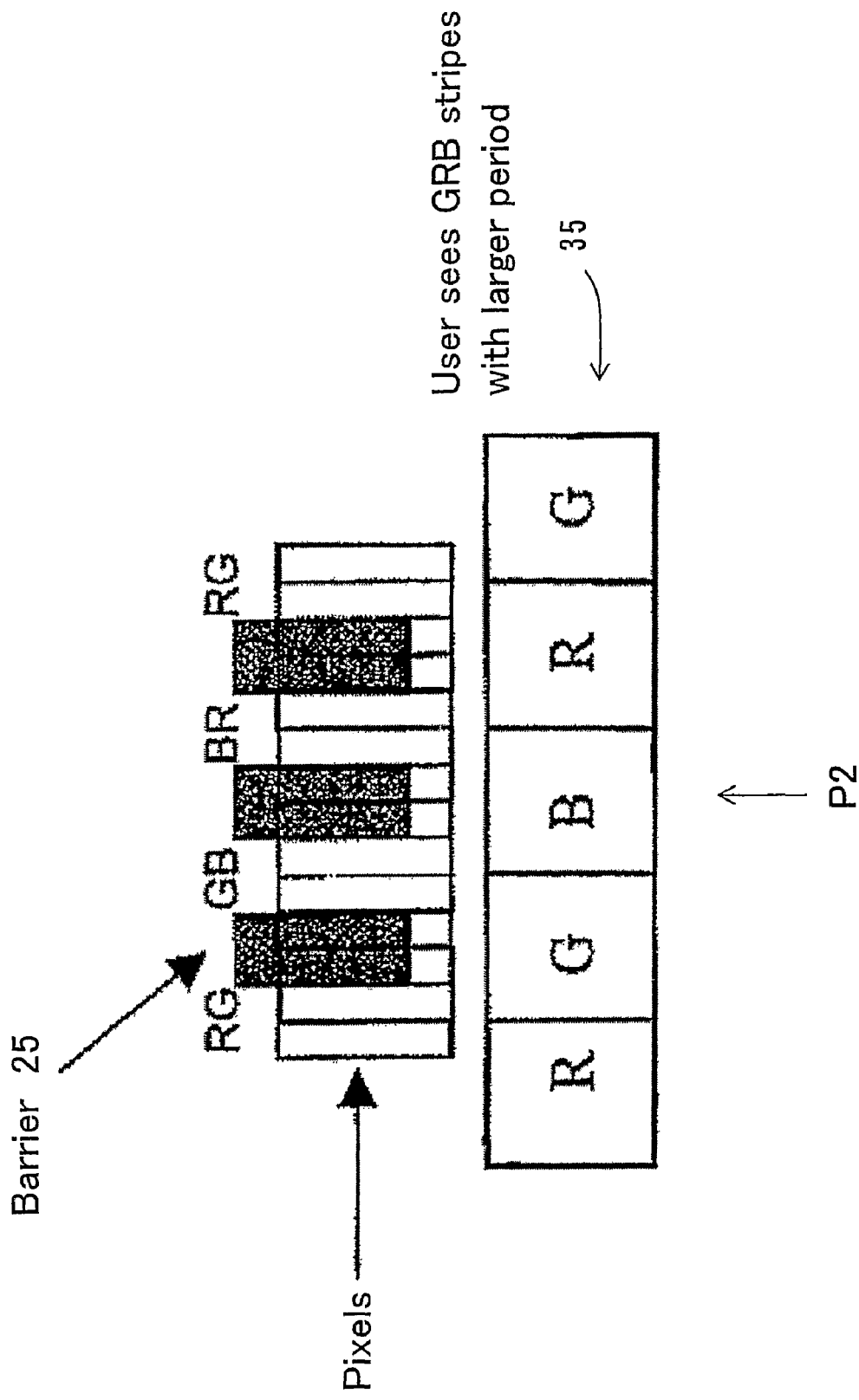
FIG. 6 illustrates an undesirable colour artifact produced by a known type of P2 display.

Like reference numerals refer to like parts throughout the drawings.

The multiple view displays described hereinafter are all of the two or dual view type but displays providing more than two views may also be provided. The displays may be used for any suitable application such as autostereoscopic 3D image display and display to more than one viewer of images which may be independent and unrelated to each other. All of the displays are colour displays made up of red, green and blue pixels with triplets of RGB pixels forming a composite colour or "white" group. However, other arrangements are possible, such as composite groups comprising RGGB pixels or RGYB pixels, where Y pixels are white. The displays comprise flat panel liquid crystal devices as the spatial light modulators and parallax barriers as the parallax optics. However, other types of spatial light modulators (including light-emitting types) and other types of parallax optics may be used.

Figure 9:
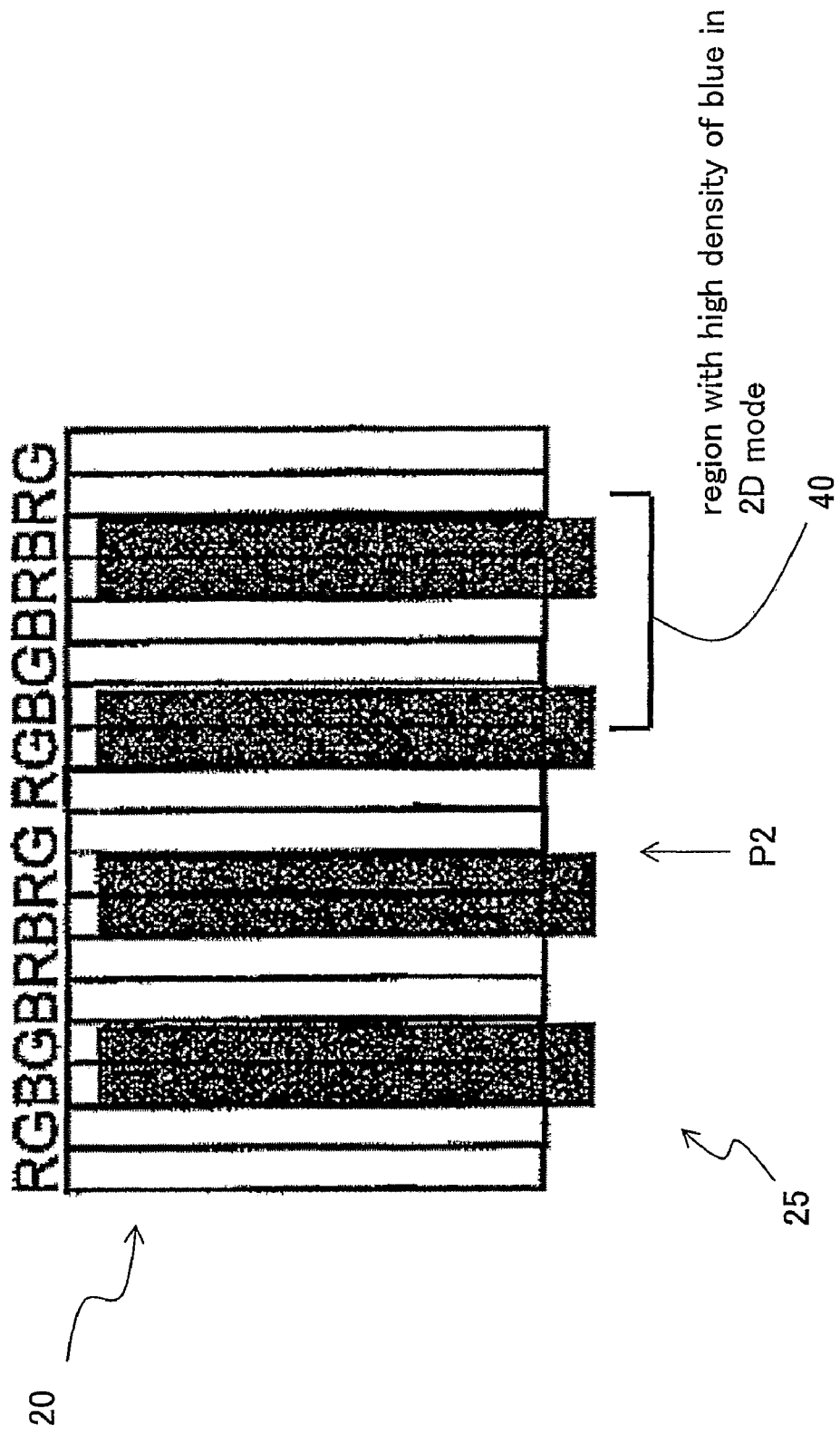
FIG. 9 is a diagram illustrating a multiple view P2 display constituting an embodiment of the invention.

The P2 display shown in FIG. 9 comprises and LCD and a parallax barrier 25 such that two columns of pixels with associated colour filter stripes are viewable in each viewing region through each slit of the parallax barrier 25. The display differs from known types of display in the horizontal ordering or sequence of red, green and blue filter stripes which extend vertically in the column direction of pixels and each of which is associated with a single pixel column. In particular, the filter sequence (from left to right in FIG. 9) comprises a repeating subsequence of RGBGBRBRG filter stripes.

Such an arrangement reduces undesirable colour artifacts in multiple view image displays. However, if such a display is used in a 2D or single view mode with the parallax barrier 25 disabled or removed, undesirable colour stripes with a period of nine pixel column may be generated. For example, in such a mode, a region with a relatively high density of blue pixels is illustrated at 40.

Figure 10:
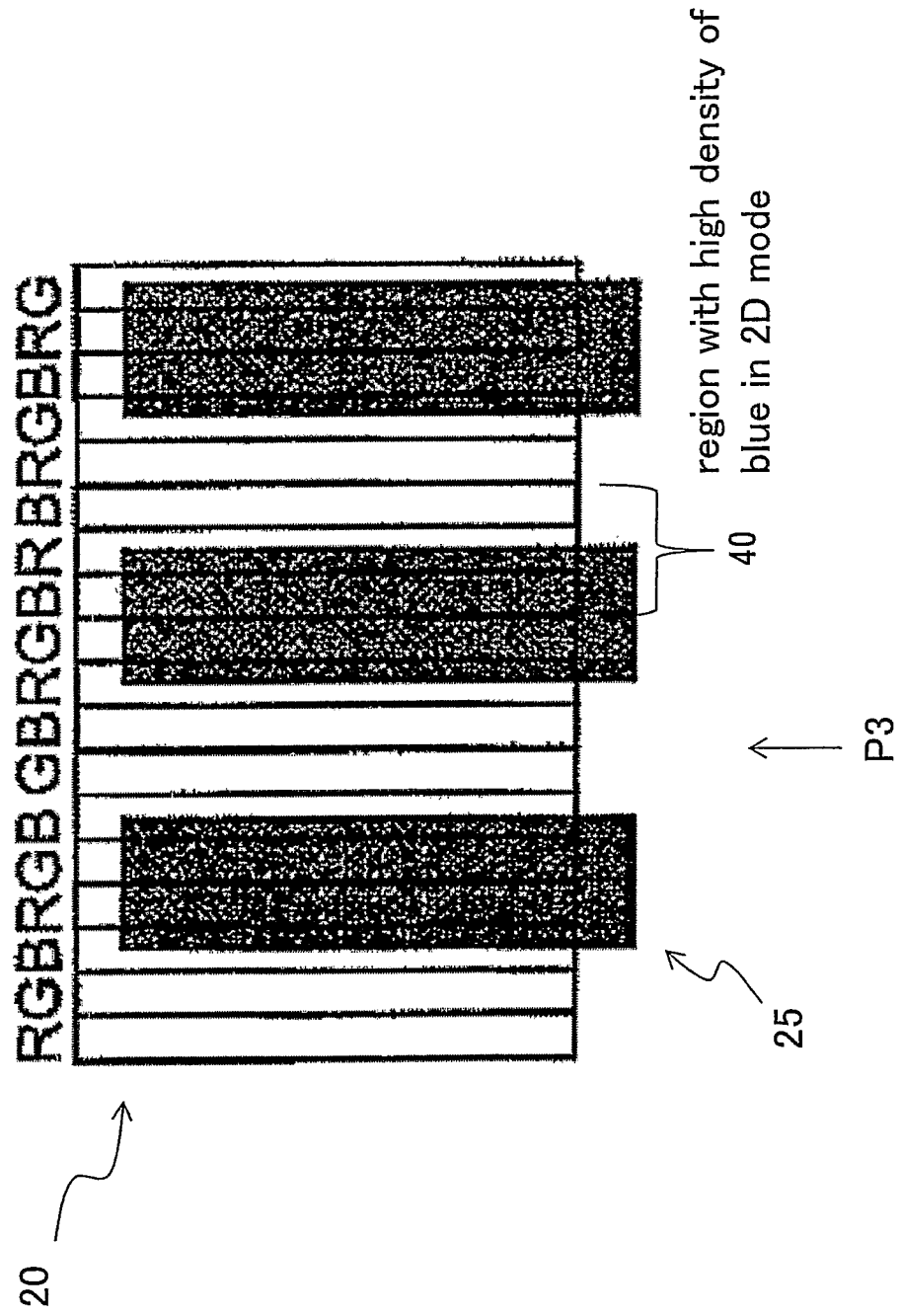
FIG. 10 is a diagram illustrating a multiple view P3 display constituting an embodiment of the invention.

FIG. 10 illustrates a P3 display in which the pixel colour sequence in the horizontal or row direction differs from known displays. In this display, the pixel colours are arranged as a repeating sequence of RGBRGBGBRGBRBRGBRG.

Such an arrangement results in different colour shifts in different columns as a viewer moves laterally in front of the display so that, at a sufficiently large viewing distance, colour shift artifacts with observer movement as described hereinbefore are reduced and may be imperceptible. However, again, when used in a single view mode with the parallax barrier 25 removed or disabled, colour stripe artifacts may be visible (a region of high blue density is shown at 40).

Figure 11:
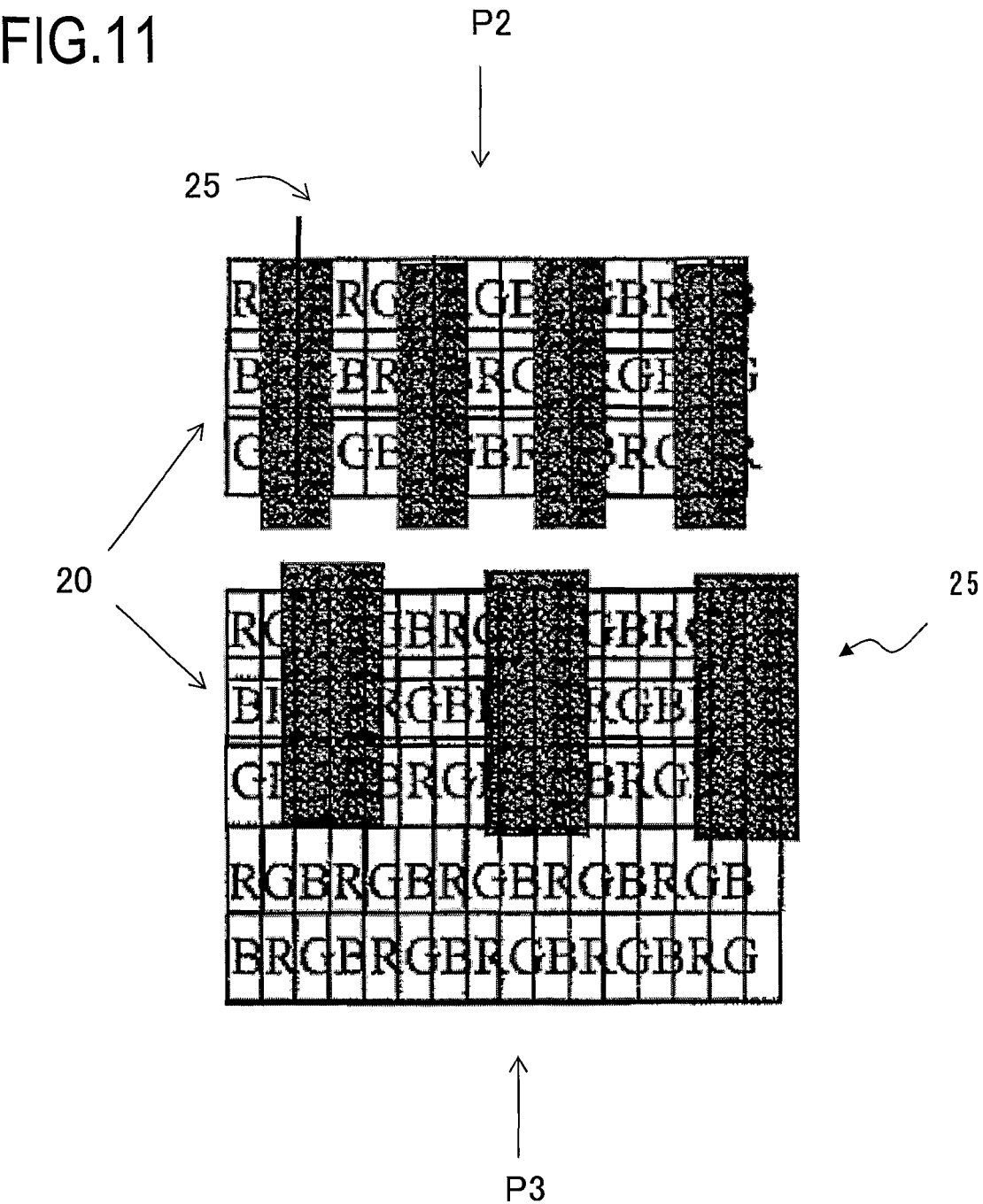
FIG. 11 is a diagram illustrating P2 and P3 displays constituting embodiments of the invention.

FIG. 11 illustrates alternative P2 and P3 displays in which the pixels are not arranged as columns of single colours. In each of these displays, each row comprises a repeating sequence of RGB pixels. However, the patterns in adjacent rows are staggered or offset in the row direction by one pixel so that the pixels of each colour are aligned diagonally on the LCD 20. In the P2 display, the colours "average" vertically through the barrier slits so that undesirable colour artifacts are substantially avoided in the multiple view and single view modes. Similarly, in the P3 display, different colour shifts occur in different rows, so that undesirable colour shift artifacts are substantially avoided.

Figure 12:
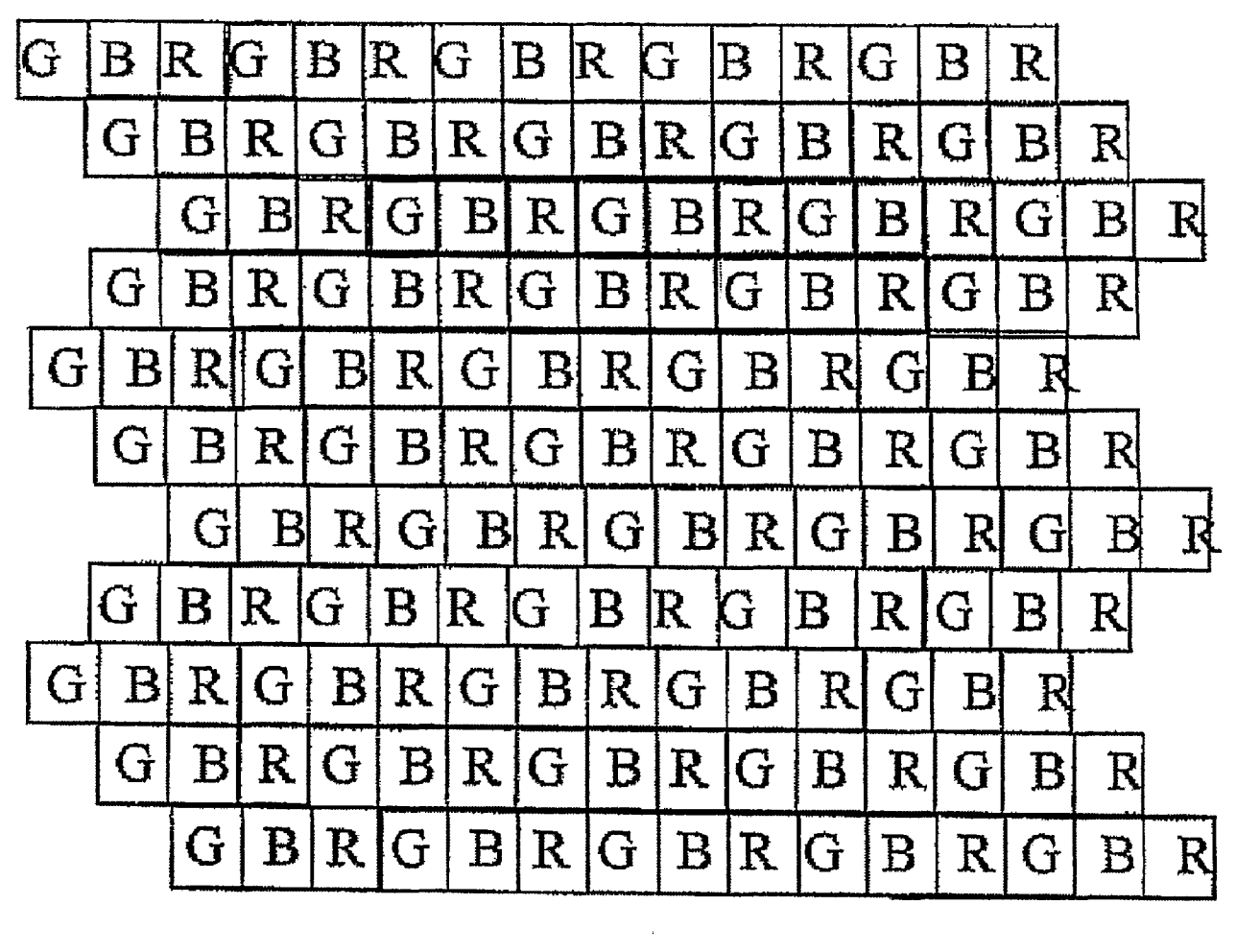

FIG. 12 illustrates an alternative pixel colour pattern for a P2 or P3 display differing from those illustrated in FIG. 11 in that the rows are staggered or offset in one direction for three rows and then in the opposite direction for three rows. Such an arrangement may be used to remove or reduce any undesirable effects caused by the diagonal colour striping in FIG. 11, for example in the single view mode.

Adjacent rows may be offset by one or two pixel pitches in the case of LCDs having pixels of three different colours. As an alternative, the order of the pixel colours may be changed in each row.

Figure 13:
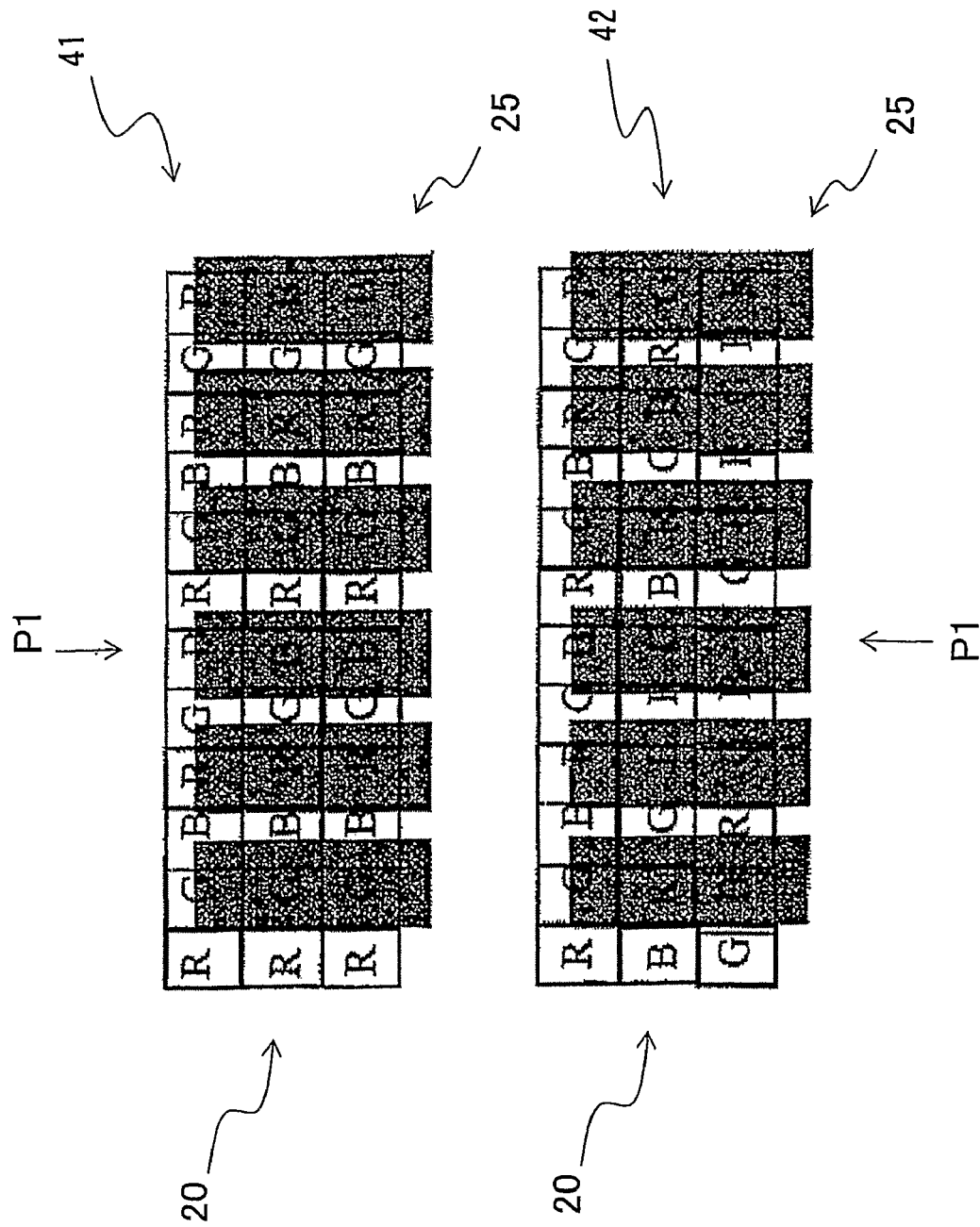
FIG. 13 is a diagram illustrating a known P1 type of display and a P1 type of display constituting an embodiment of the invention.

FIG. 13 illustrates a P1 display of known type at 41 and a P1 display constituting an embodiment of the invention at 42. The P1 display at 42 uses the same colour pixel pattern as the displays shown in FIG. 11 so that the pixels of each colour which are viewable in each viewing window are substantially evenly spaced vertically and horizontally, although the vertical and horizontal pitches may be different from each other.

When, for example, P2 and P3 displays are used as autostereoscopic 3D displays, it is possible for a binocular disparity to arise between pixels of different colours because of the colour pixel patterning in relation to the parallax barrier structure. This may result in unexpected stereoscopic features. For example, a red plane and a green plane which are intended to appear at the same distance from the viewer may appear to be separated in depth.

Figures 14, 15, 16:
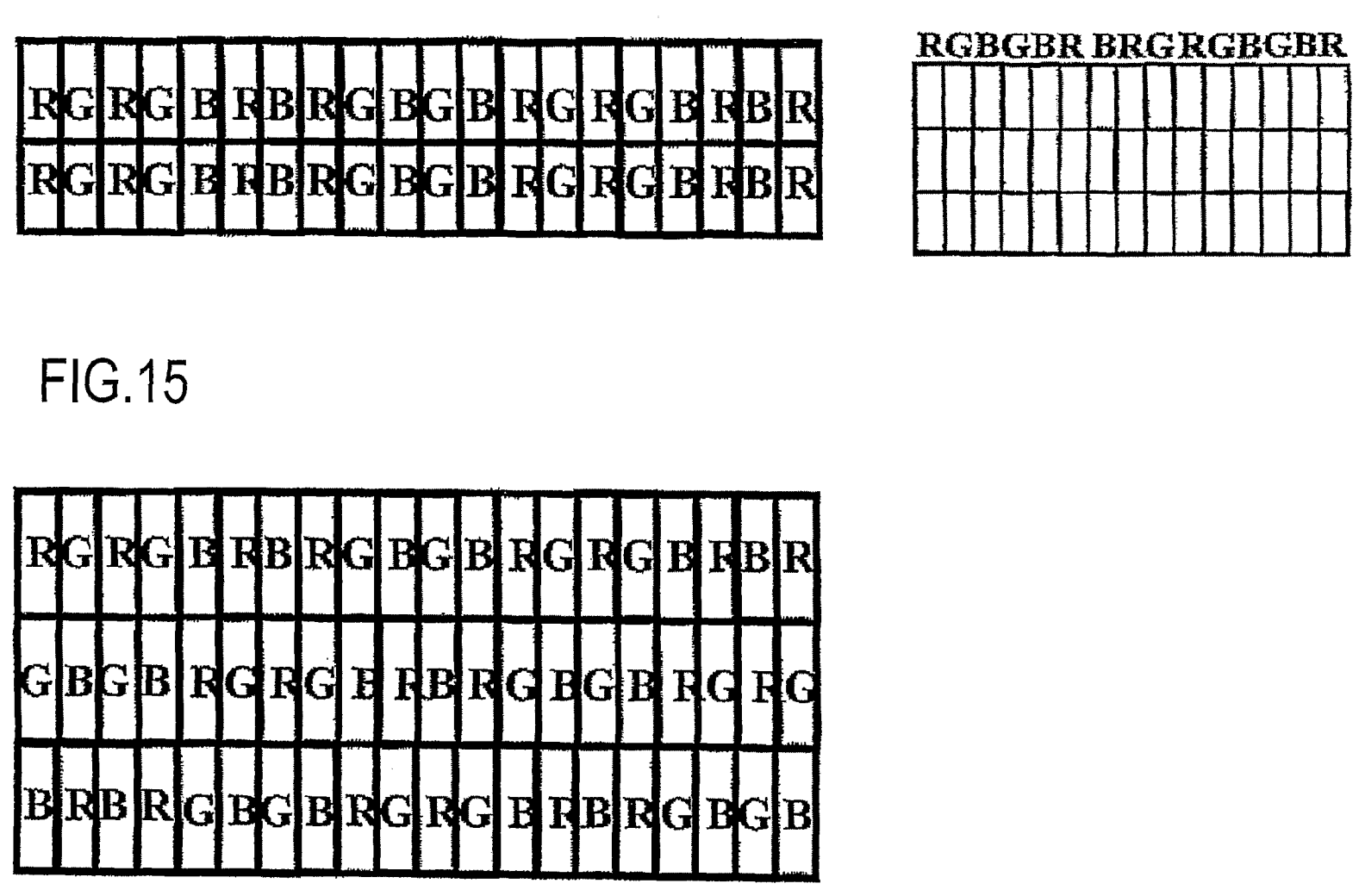

FIGS. 14 to 16 illustrate colour pixel patterns which may be used in order to reduce variations in binocular disparity between the individual colours. FIGS. 14 and 15 illustrate patterns for use with displays of the P2 type. Thus, FIG. 14 illustrates a pattern in which the colours are arranged as vertical strips with a horizontally repeating sequence of RGRGBRBRGBGB.

FIG. 15 illustrates a pattern based on the same repeating colour sequence but in which adjacent rows are offset by four pixel column widths. The pattern shown in FIG. 16 is the same as that shown in FIG. 9.

In the previously described embodiments, each parallax barrier 25 comprises evenly spaced continuous vertical slits. In the embodiments illustrated in FIGS. 11, 12 and 15, adjacent rows of pixel colours are offset from each other in the row direction. The continuous vertical slits are equivalent to and may be considered as individual slits for each row, which slits are aligned with each other in the row direction to form the continuous vertical slits in the column direction. However, a similar performance may be achieved by having offset rows of slits cooperating with colour pixel patterns where each column of pixels is of the same colour.

Figure 17:
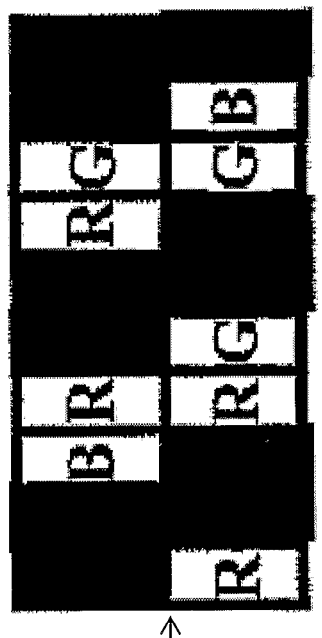
FIGS. 17 and 18 illustrate P2 types of displays with staggered barrier slit arrangements constituting embodiments of the invention.

FIG. 17 illustrates an example of such an arrangement in which the colour filter stripes are arranged as a repeating sequence of RGB stripes. Each row of pixels cooperates with a row of slits with the slits of adjacent rows being offset approximately by the pixel column pitch (allowing for view point compensation). This arrangement may be used in a P2 type of display and is effectively equivalent to the P2 display shown in FIG. 11.

Figure 18:
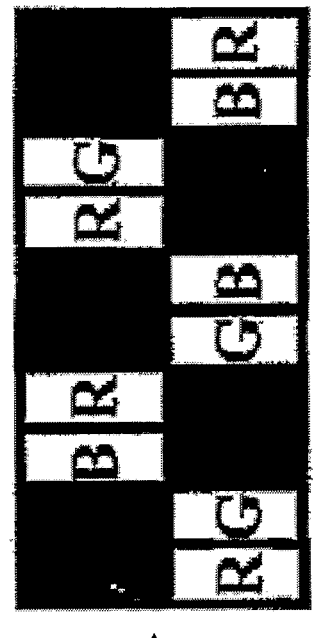

FIG. 18 illustrates a P2 display in which the offset between adjacent rows of slits of the parallax barrier is equal to approximately twice the pixel column pitch (allowing for viewpoint compensation).

Figure 19:
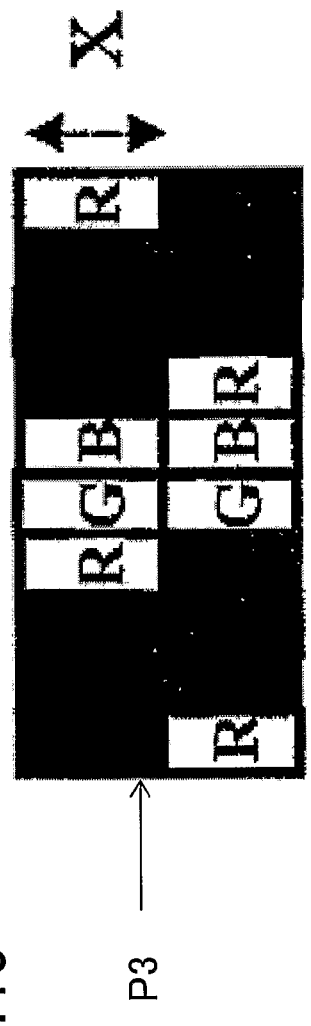
FIG. 19 illustrates a P3 type of display with a staggered barrier slit arrangement constituting an embodiment of the invention.

FIG. 19 illustrates a P3 display in which the adjacent rows of slits are offset relative to each other by approximately one pixel column pitch (allowing for viewpoint compensation).

Displays of the type shown in FIGS. 17 to 19 have limited vertical freedom of movement of the viewer in order to avoid crosstalk. In particular, if a viewer views the display from above or below the intended horizontal viewing plane, the wrong pixels become visible through the parallax barrier slits. This effect may be reduced by reducing the height of the individual slits (indicated by X in FIG. 19) to provide greater vertical viewing freedom at the expense of reduced brightness for a given display illumination.

Figures 20, 21:
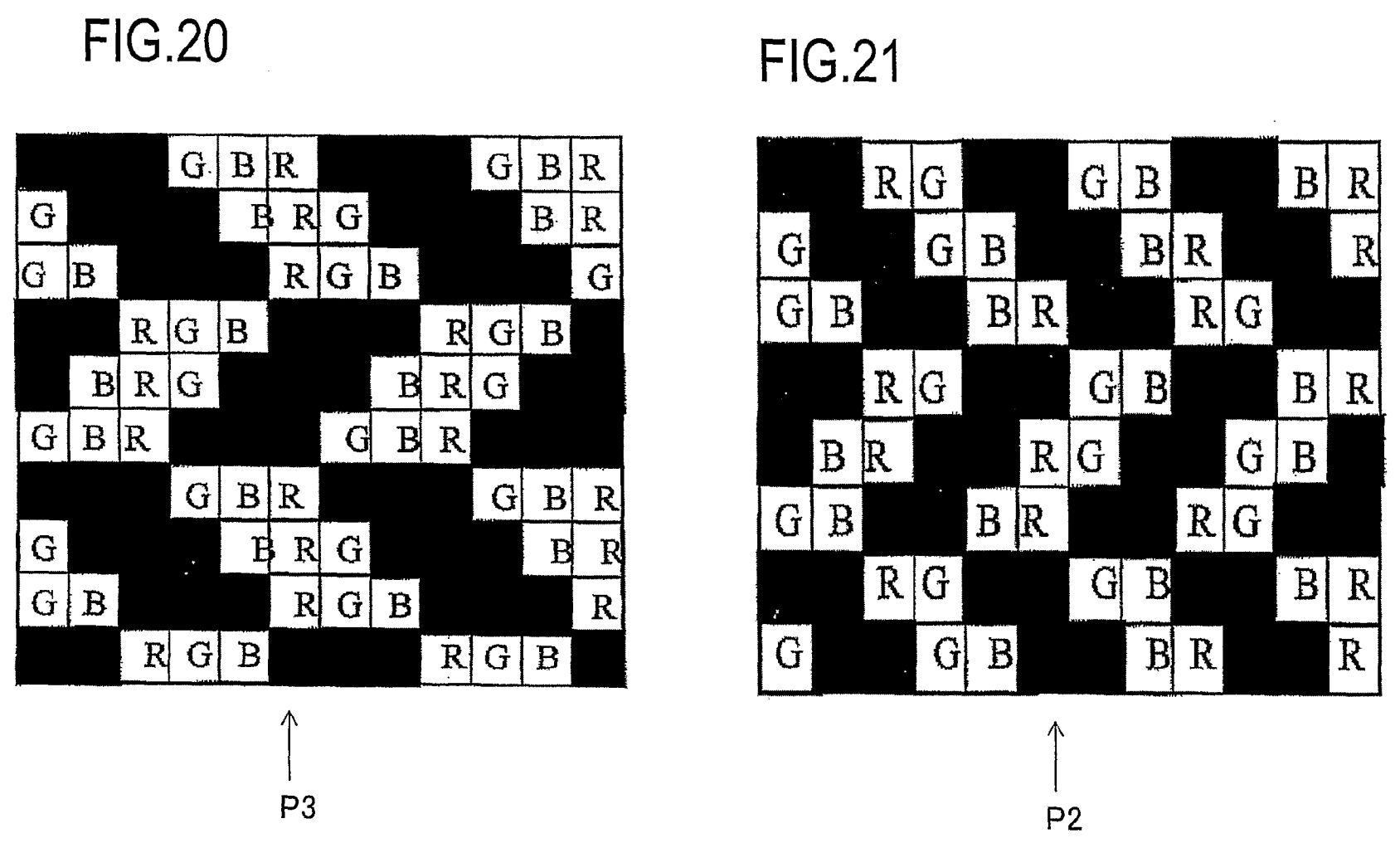

FIGS. 20 and 21 illustrate modifications of the P3 and P2 displays shown in FIGS. 19 and 17, respectively, in order to reduce or remove any diagonal "banding" which might be unacceptable. In each of these displays, the parallax barrier slit rows are offset in one direction for three rows and then in the opposite direction for three rows.

Figure 7:
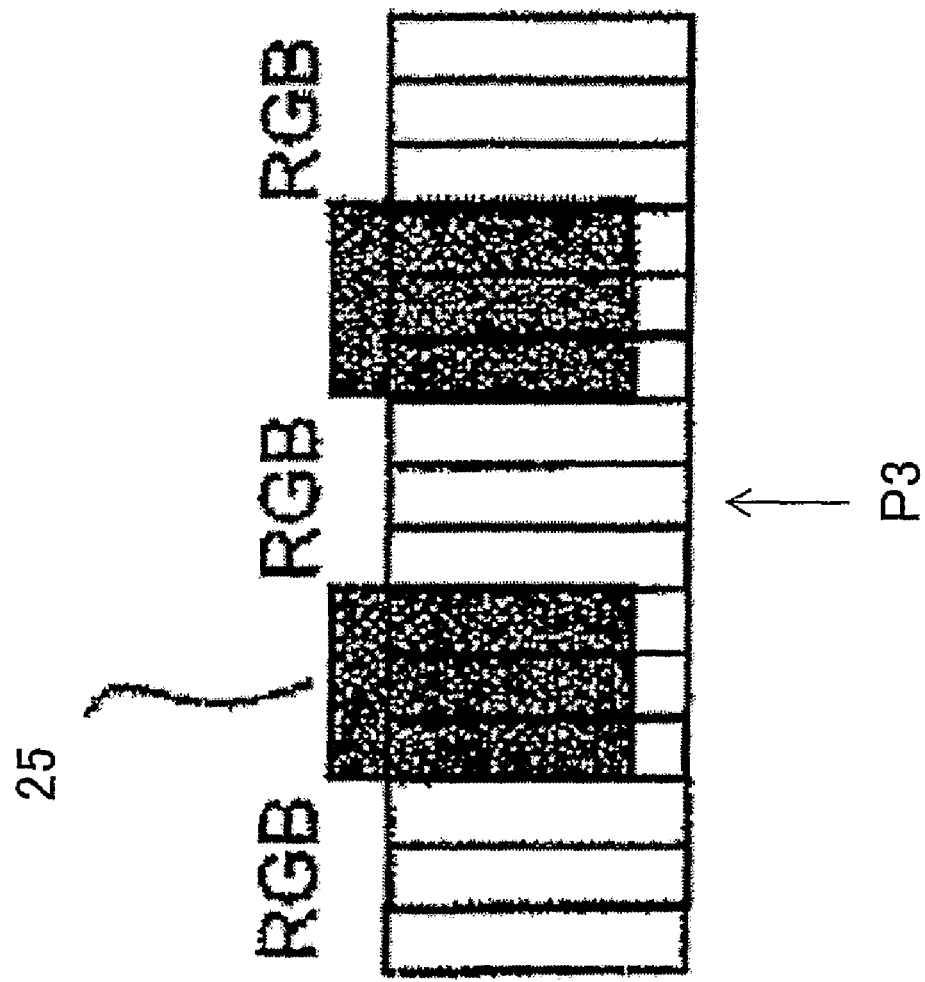
FIGS. 7 and 8 illustrate the generation of an undesirable visual artifact in a known type of P3 display.
Figure 8:
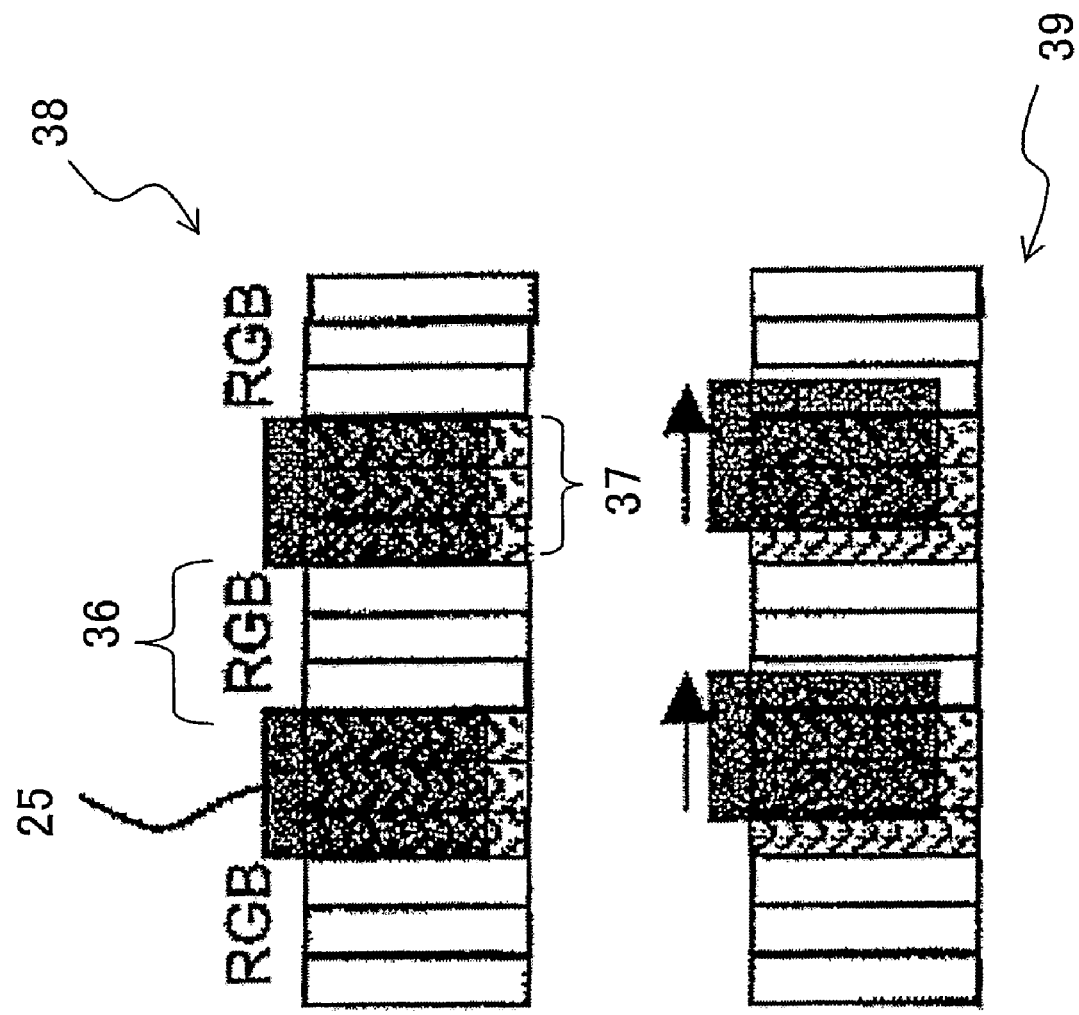
Figure 22:
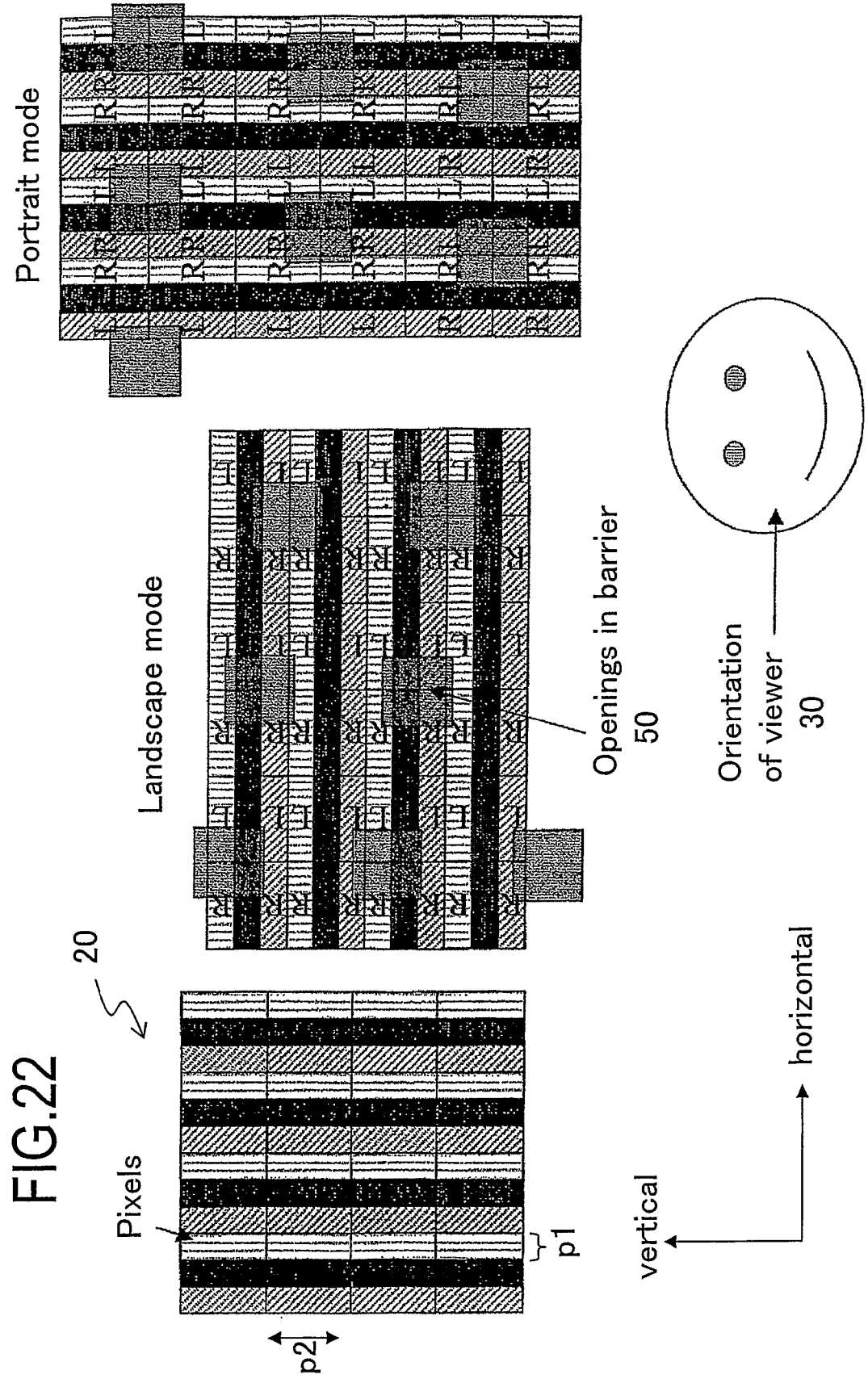
FIG. 22 illustrates a P3 type of display having portrait and landscape viewing modes and constituting an embodiment of the invention.

FIG. 22 illustrates a P3 display which may be used in a portrait viewing mode or a landscape viewing mode or may be switched between these modes. The LCD 20 comprises a vertically striped colour filter with repeating groups of RGB stripes, for example as illustrated in FIG. 7. The individual colour pixels are arranged as square-shaped composite colour groups so that the pitch p2 of the rows is approximately three times the pitch p1 of the columns with the display oriented in the portrait mode.

The parallax barrier comprises a pattern of openings such as 50 of square shape. In the portrait mode, the openings 50 are arranged as rows with a pitch differing from 6p1 so as to provide viewpoint correction. Adjacent rows are offset with respect to each other by approximately the column pitch p1 and each row of openings 50 cooperates with two rows of pixels.

In FIG. 22, pixels of different colours are indicated by different shading and the pixels which display left and right image pixels are indicated by L and R, respectively.

In the portrait mode, the display of FIG. 22 overcomes the colour shifting artifacts described hereinbefore in the same way as the display illustrated in FIG. 19.

In the landscape mode, the display is effectively rotated through 90 degrees so that the barrier openings 50 are arranged as columns with a pitch of 2p2. In this viewing mode, the right and left eyes of the viewer 30 can see the same areas of pixels of different colours throughout a wide lateral viewing range without any undesirable colour shifting artifacts.

The allocation of the LCD pixels to the left and right images changes between the portrait and landscape modes. When the display is of the type which is switchable between these modes, a display controller may be arranged to allocate the pixels correctly to the left and right views when the display orientation is changed. This may be actuated automatically or manually.

If the display is not required to be switchable between the portrait and landscape viewing modes, then the display controller may be preset to provide the pixel allocation for the mode of operation of the display.

Figure 23:
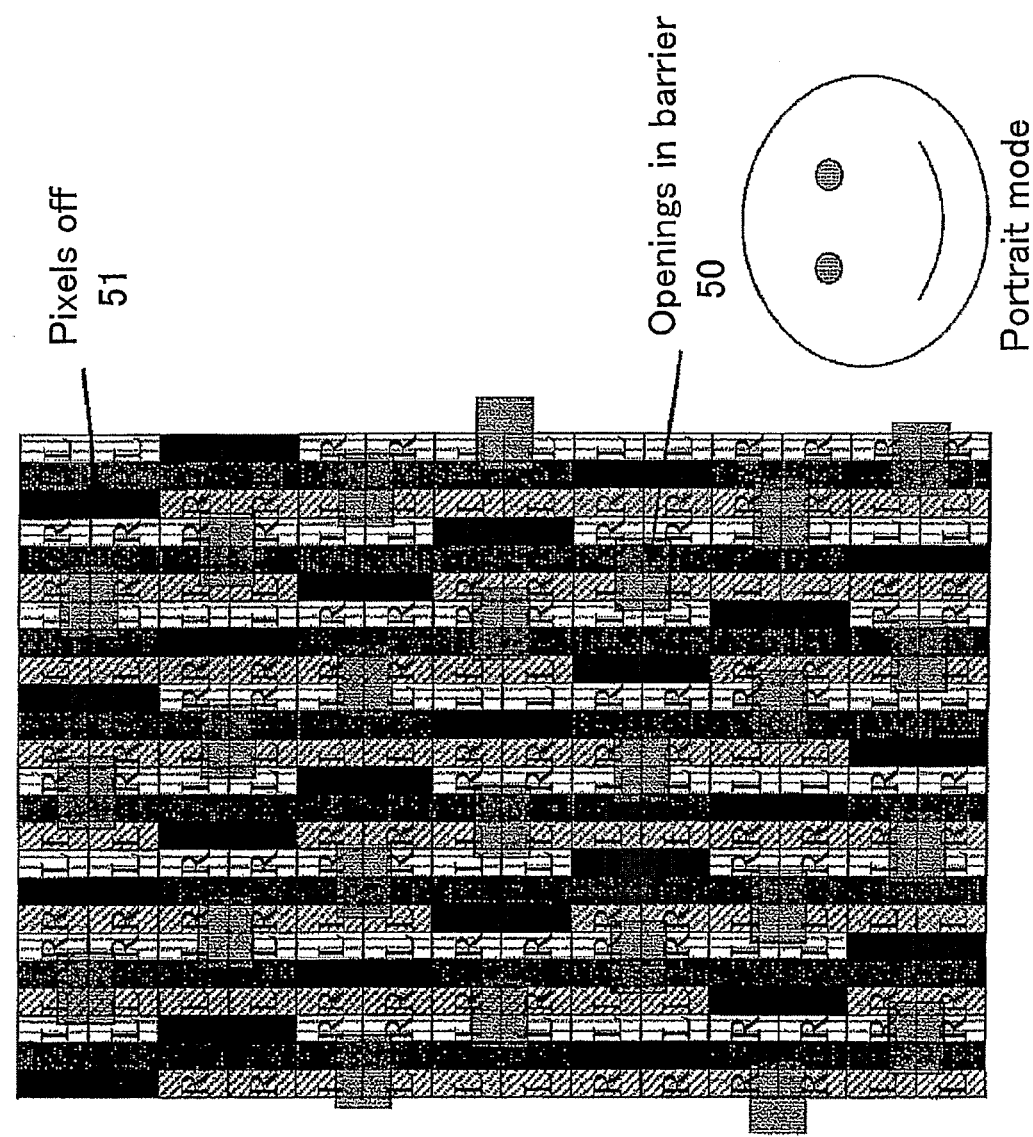
FIG. 23 illustrates another P3 type of display having portrait and landscape viewing modes and constituting an embodiment of the invention.

FIG. 23 illustrates only the portrait mode of another P3 display which may be switched between portrait and landscape modes. For the dual view display illustrated in FIG. 23, the rows of pixel are arranged in groups of six separated from each other by pixels such as 51 which are switched to their black state. Alternatively, such pixels 51 may be used to display data for one of the views or may be controlled to show a grey level appropriate to both views so as to increase viewer freedom. The rows of openings are staggered in the row direction by an amount which differs from twice the column pitch in order to provide viewpoint correction. Similarly, the pixels 51 which are switched to black are staggered in adjacent rows by twice the column pitch. The presence of a "redundant" pixel 51 separating groups of six pixel in each row results in the colour viewable from each primary viewing region through each opening 50 in the middle of the set of three pixels cycling through red, green and blue across the display in the row direction. Staggering of the redundant or black pixels between adjacent pairs of rows results in the colour being balanced across four rows and provides relatively small colour separation which is less visible to the viewer.

In order to provide a 2D or single view mode of operation, the parallax barrier in all of the embodiments may be removed or disabled. For example, the parallax barrier may comprise a switchable liquid crystal cell having the appropriate electrode-patterning so as to be switchable between a multiple view mode with the barrier structure being provided and a single view mode with the barrier structure being disabled.

The invention claimed is:
1. A multiple view display comprising:
   a parallax optic comprising a plurality of parallax elements spaced apart at a single first pitch; and
   a spatial light modulator comprising a plurality of columns of pixels arranged with a second pitch providing view- point correction for creating n primary viewing windows for viewing n views, where n is an integer greater than one, wherein w columns of pixels are viewable through each parallax element in each viewing window, where w is an integer greater than one, the pixels of each column being of a same colour, and wherein the columns are x different colours, where x is an integer greater than two and arranged as a sequence of colours comprising repeating groups of a same sub-sequence, and each repeating group comprises y sub-groups of z columns, where y is an integer greater than one and z is an integer greater than or equal to x, and each subgroup containing columns of all x colours, and wherein the smallest repetition pitch of the sub-sequence is equal to y times z columns.

2. A display as claimed claim 1, wherein the modulator includes a striped colour filter arrangement whose stripes are aligned with the columns.

3. A display as claimed in claim 1, wherein the number x of colours is equal to three.

4. A display as claimed in claim 3, wherein the three colours are primary colours.

5. A display as claimed in claim 4, wherein the primary colours are red, green and blue.

6. A display as claimed in claim 1, wherein the number z of columns of each subgroup is equal to x.

7. A display as claimed in claim 1, wherein the number w of columns viewable in each window is equal to two.

8. A display as claimed in claim 7, wherein the number y of subgroups in each group is equal to three.

9. A display as claimed in claim 8, wherein each sub-sequence is red, green, blue, green, blue, red, blue, red, green.

10. A display as claimed in claim 1, wherein the number w of columns viewable in each window is equal to three.

11. A display as claimed in claim 10, wherein the number y of subgroups in each group is equal to six.

12. A display as claimed in claim 11, wherein the primary colours are red, green and blue, the number z of columns of each subgroup is equal to x, and each sub-sequence is red, green, blue, red, green, blue, green, blue, red, green, blue, red, blue, red, green, blue, red, green.

13. A multiple view display comprising:
a parallax optic comprising a plurality of parallax elements; and
a spatial light modulator comprising a plurality of pixels arranged as rows and columns cooperating with the parallax optic to create n primary viewpoint-corrected viewing windows for viewing n views, where n is an integer greater than one,
wherein a respective single column of pixels is viewable through each parallax element in each viewing window, the pixels being arranged as composite colour groups for displaying respective colour image elements,
wherein each colour group comprises z pixels of x different colours disposed adjacent each other in the same column, where x is an integer greater than two and z is an integer greater than or equal to x, the pixels of each colour for each view being disposed so as to be substantially evenly spaced horizontally and substantially evenly spaced vertically, and
wherein the order in the column direction of the colours of the pixels of each colour group is different from the order in the column direction of the colours of the pixels of each adjacent colour group in the same rows.

14. A display as claimed in claim 13, wherein the pixels of each colour are disposed so as to be substantially evenly spaced horizontally and substantially evenly spaced vertically on the modulator.

15. A display as claimed in claim 13, wherein the pixels are arranged in the row direction as repeating sets of z pixels of the x different colours with each row being offset in the row direction relative to each adjacent row by a number of pixels greater than zero and less than z.

16. A display as claimed in claim 15, wherein the offsets between adjacent rows have the same magnitudes.

17. A display as claimed in claim 15, wherein the offsets between adjacent rows have the same directions.

18. A display as claimed in claim 13, wherein the number x of different colours is three.

19. A display as claimed in claim 18, wherein the three colours are primary colours.

20. A display as claimed in claim 19, wherein the primary colours are red, green and blue.

21. A display as claimed in claim 13, wherein the number z of pixels in each group is equal to x.

22. A multiple view display comprising:
a parallax optic-comprising a plurality of parallax elements; and
a spatial light modulator comprising a plurality of pixels arranged as rows and columns cooperating with the parallax optic to create n primary viewpoint-corrected viewing windows for viewing n views, where n is an integer greater than one,
wherein w pixels in each row are viewable through each parallax element in each viewing window, where w is an integer greater than one,
wherein the rows are arranged as groups and the parallax elements are arranged as rows, each of which is aligned with a respective group of rows of pixels, and
the pixels comprise sets of pixels of different colours arranged such that the sequence of pixel colours viewable in each viewing window through each parallax element of each row of parallax elements is different from the sequence of pixel colours viewable through the or each nearest parallax element in the or each adjacent row of parallax elements.

23. A display as claimed in claim 22, wherein the parallax elements are aligned in the row direction.

24. A display as claimed in claim 23, wherein the parallax elements are continuous in the column direction.

25. A display as claimed in claim 23, wherein the pixels are arranged as repeating colour sequences in the row direction and the rows of pixels of each adjacent pair of groups are offset with respect to each other in the row direction by at least one pixel pitch and by less than the smallest repetition pitch of the repeating colour sequence.

26. A display as claimed in claim 25, wherein the offsets are of the same magnitude.

27. A display as claimed in claim 25, wherein the offsets are in the same direction.

28. A display as claimed in claim 25, wherein the groups of rows of pixels or the rows of parallax elements are arranged as sets with offsets of the sets being in the same direction and with the offsets of adjacent pairs of sets being in opposite directions.

29. A display as claimed in claim 22, wherein the pixels of each colour are arranged as columns.

30. A display as claimed in claim 29, wherein the parallax elements of each adjacent pair of rows are offset with respect to each other in the row direction.

31. A display as claimed in claim 22, wherein each group of rows comprises a single row.

32. A display as claimed in claim 22, wherein each group of rows comprises a plurality of rows.

33. A display as claimed in claim 32, wherein each group of rows comprises n rows, the display is rotatable between a portrait orientation and a landscape orientation, and the parallax elements are arranged to provide two dimensional parallax.

34. A display as claimed in claim 33, wherein the parallax elements of each adjacent pair of rows are offset with respect to each other in the row direction, and the offset differs from twice the pitch of the columns to provide viewpoint correction.

35. A display as claimed in claim 33, wherein the pixels of each row are arranged as groups of n.w pixels separated from each other by the pitch of the columns.

36. A display as claimed in claim 22, wherein the number w is equal to two and the different sequences of pixel colours comprise different combinations.

37. A display as claimed in claim 22, wherein the number w is equal to three and the different sequences of pixel colours comprise different permutations.

38. A display as claimed in claim 22, wherein the parallax optic is a parallax barrier.

39. A display as claimed in claim 22, wherein the spatial light modulator is a light-attenuating modulator.

40. A display as claimed in claim 39, wherein the modulator is transmissive.

41. A display as claimed in claim 39, wherein the modulator is a liquid crystal device.

42. A display as claimed in claim 22, wherein the number n of windows is equal to two.

43. A display as claimed in claim 22, wherein the sets of pixels are of three colours.

44. A display as claimed in claim 43, wherein the three colours are primary colours.

45. A display as claimed in claim 44, wherein the primary colours are red, green and blue.

* * * * *